(12) United States Patent
Bortolin

(10) Patent No.: US 7,730,773 B2
(45) Date of Patent: Jun. 8, 2010

(54) METHOD AND APPARATUS FOR DETECTING A CONTINUOUS LF WAVE SIGNAL

(75) Inventor: Dino Bortolin, Ontario (CA)

(73) Assignees: TRW Automotive U.S. LLC, Farmington Hills, MI (US); Michelin Recherche et Technique S.A., Granges-Paccot (CH)

( * ) Notice: Subject to any disclaimer, the term of this patent is extended or adjusted under 35 U.S.C. 154(b) by 62 days.

(21) Appl. No.: 12/237,644

(22) Filed: Sep. 25, 2008

(65) Prior Publication Data

US 2010/0071454 A1 Mar. 25, 2010

(51) Int. Cl.
*B60C 23/02* (2006.01)
(52) U.S. Cl. .................................. 73/146.5
(58) Field of Classification Search ........................ None
See application file for complete search history.

(56) References Cited

U.S. PATENT DOCUMENTS

| 6,735,183 | B2 | 5/2004 | O'Toole et al. | |
|---|---|---|---|---|
| 2001/0024468 | A1* | 9/2001 | Miyashita et al. | 375/228 |
| 2001/0045840 | A1* | 11/2001 | Cirkel et al. | 324/765 |
| 2005/0190830 | A1* | 9/2005 | Miyashita et al. | 375/228 |
| 2005/0263591 | A1* | 12/2005 | Smith | 235/385 |

\* cited by examiner

*Primary Examiner*—Andre J Allen
(74) *Attorney, Agent, or Firm*—Tarolli, Sundheim, Covell & Tummino LLP

(57) ABSTRACT

An apparatus for detecting a continuous wave (CW) signal including a demodulator demodulating a received CW signal and providing a demodulated signal, an edge detector for detecting an edge of the demodulated signal and thereby, detecting the CW signal and a switchable short-circuit of the demodulator, edges being formed in the demodulated signal when the demodulator is temporarily short-circuited during receipt of the CW signal.

19 Claims, 5 Drawing Sheets

METHOD AND APPARATUS FOR DETECTING A CONTINUOUS LF WAVE SIGNAL

TECHNICAL FIELD

The present invention is directed to a tire pressure monitoring system and is particularly directed to a method and an apparatus for detecting a continuous low frequency ("LF") wave signal in a tire pressure monitoring system.

BACKGROUND

A tire pressure monitoring system can be used to inform a vehicle driver of a tire condition problem such as improper tire pressure and/or temperature. Improper inflation pressure information is particularly useful to the driver of a vehicle having "run flat" tires. Before the use of run flat tires, in the event of sudden tire pressure lose (e.g. a tire is punctured) while driving, the driver could usually feel the condition due to a change in the handling characteristics of the vehicle. However, with the advent of the run flat tires, a driver might not detect sudden tire pressure lose. However, it is still important that the driver be informed, even with a run flat tire, when tire pressure and/or temperature values are not within predetermined limits.

To implement a tire pressure monitoring ("TPM") system, a vehicle based electronic control unit ("ECU") can control a plurality of low frequency ("LF") transmitters, each wheel well having an associated LF transmitter. The LF transmitters transmits a LF signal to an associated TPM sensor mounted within its associated tire assembly secured to the wheel, for example. When the LF signal is received by each TPM sensor, the TPM sensor will process the LF signal, sense the pressure of its, tire, and transmit a radio frequency ("RF") signal back to the vehicle based ECU. The ECU will process the RF signals from all the TPM's of the tires and provide an output signal to a display that is viewable by the vehicle's driver that will indicate an abnormal pressure status of any of the tires on the vehicle.

In some instances, the LF signal provided to each TPM sensor is in the form of an amplitude shift-keying ("ASK") modulated signal. The TPM sensor would include a demodulator that can demodulate the ASK signal such that the rising edges of the ASK signal can be detected. However, in other instances, the LF signal provided to each TPM sensor is an unmodulated continuous wave ("CW") signal. Since the CW signal is unmodulated, a TPM sensor would not be able to detect a rising edge of the CW signal if the CW signal is present before the TPM sensor has already been activated, as a demodulated CW wave is a substantially constant waveform. If the CW signal is not present when the TPM sensor is initially activated, then the TPM sensor will detect exactly one rising edge, at the time when the TPM sensor first receives the CW signal. However, in some applications, the CW signal is present before the TPM sensor is activated, such that the TPM sensor will never detect the CW wave. In other applications, the TPM sensor may be activated before the CW signal is first received, but as stated above, the TPM sensor will detect only one rising edge, while many applications would require multiple rising edges to be detected.

Previous attempts to design a TPM sensor that can detect an LF CW signal have proven to be expensive. Such previous attempts require a separate circuit specifically designed to detect the CW signal, and such circuits usually require a significant number of components and occupy valuable space on a printed circuit board ("PCB"). What is needed is a TPM sensor that can be programmed to detect both, amplitude modulated ("AM") signals, and CW signals.

SUMMARY OF THE INVENTION

An apparatus for detecting a continuous wave (CW) signal, the apparatus comprising a demodulator demodulating a received CW signal and providing a demodulated signal, an edge detector for detecting an edge of the demodulated signal and thereby, detecting the CW signal and a switchable short-circuit of the demodulator, edges being formed in the demodulated signal when the demodulator is temporarily short-circuited during receipt of the CW signal.

The present invention can also be described as an apparatus for detecting a CW signal, the apparatus comprising receiving means for receiving the CW signal, demodulating means for determining an envelope of the received CW signal, edge detecting means for detecting an edge of the envelope and thereby detecting the CW wave signal and short-circuiting means for temporarily short-circuiting the demodulating means, edges being formed in the envelope when the demodulating means is temporarily short-circuited during the receipt of the CW signal.

The present invention can also be described as a method for detecting and processing a CW signal, the method comprising receiving the CW signal at an antenna, providing the CW wave to an input of a demodulator, providing an output of the demodulator to an edge detector, activating a short-circuiting switch to short-circuit the demodulator at predetermined periodical intervals, deactivating the short-circuiting switch to create a rising edge in the output of the demodulator and detecting the rising edge at the edge detector.

BRIEF DESCRIPTION OF THE DRAWINGS

The foregoing and other features and advantages of the invention will become apparent to one skilled in the art upon consideration of the following description of the invention and the accompanying drawings in which.

DETAILED DESCRIPTION

Figure 1:
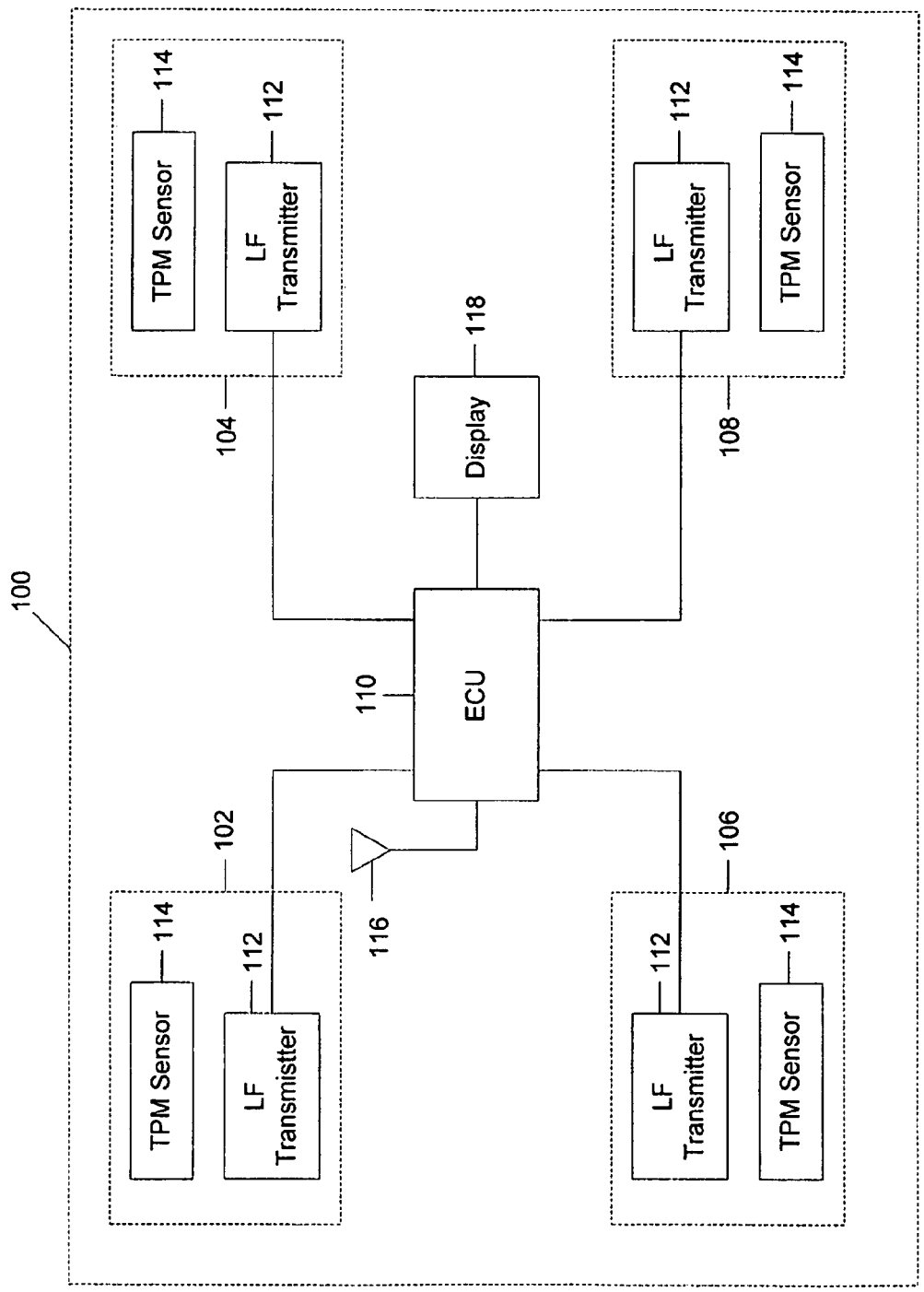
FIG. 1 illustrates a system that implements an embodiment of the present invention.

FIG. 1 illustrates an example embodiment of the present invention. A vehicle 100 includes four tires wells 102, 104, 106, 108. It is to be understood that the vehicle could include more or less tire wells. The vehicle also includes at least one electronic control unit (ECU) 110. Each wheel well 102, 104, 106, 108 includes at least one low frequency (LF) transmitter 112. Each wheel well further includes at least one tire pressure monitoring (TPM) sensor 114. The ECU 110 includes at least one antenna 116 for receiving radio frequency (RF) signals. The ECU 110 is connected to each of the LF transmitters 112. The ECU 110 is also connected to a display 118 that is viewable by a vehicle occupant.

The ECU 110 provides each LF transmitter 112 with an LF signal. The LF transmitters 112 transmit LF signals to the TPM sensors 114. The TPM sensors 114 receive the LF signal, process the signal in the processor, sense the current tire pressure of a tire in the corresponding tire well, and generate an RF signal based on that sensed pressure. The ECU 110 receives the RF signals at the antenna 116, and processes the RF signals. The ECU 110 will then provide a signal to the display 118 to indicate the tire pressure detected by the TPM sensors 114.

By way of example, the ECU 110 can provide the display 118 a signal to indicate a tire pressure of "LOW" when the tire pressure detected by the TPM sensors falls below a predetermined value. Additionally or alternatively, the ECU 110 can provide the display 118 a signal to indicate a tire pressure of "HIGH" when the tire pressure detected by the TPM sensors rises above a predetermined value. The display 118 can be, for example, an liquid crystal display (LCD) screen, a constellation of light emitting diodes (LEDs), or a single indicator. Obviously, increasing the complexity of the display system increases the information ascertainable by the vehicle occupant concerning the pressure of the vehicle tires.

In the present example, the LF signal transmitted to the TPM sensors 114 can be an amplitude modulated (AM) signal or an unmodulated continuous wave (CW) signal. Typically, the AM signal is in the form of an Amplitude. Shift-Keying (ASK) signal. For clarity and convenience, henceforth, the LF signal will be in the form of an unmodulated CW signal, unless otherwise specified. Accordingly, it will be assumed that the CW signals have a substantially constant peak voltage and a substantially constant frequency. However, it is to be understood that the present invention could be designed to detect CW waves at any frequency, and LF signals are shown simply as one method of implementation. Additionally, it is to be assumed that in the present examples, the CW signal is present before the TPM sensor is activated.

Figure 2:
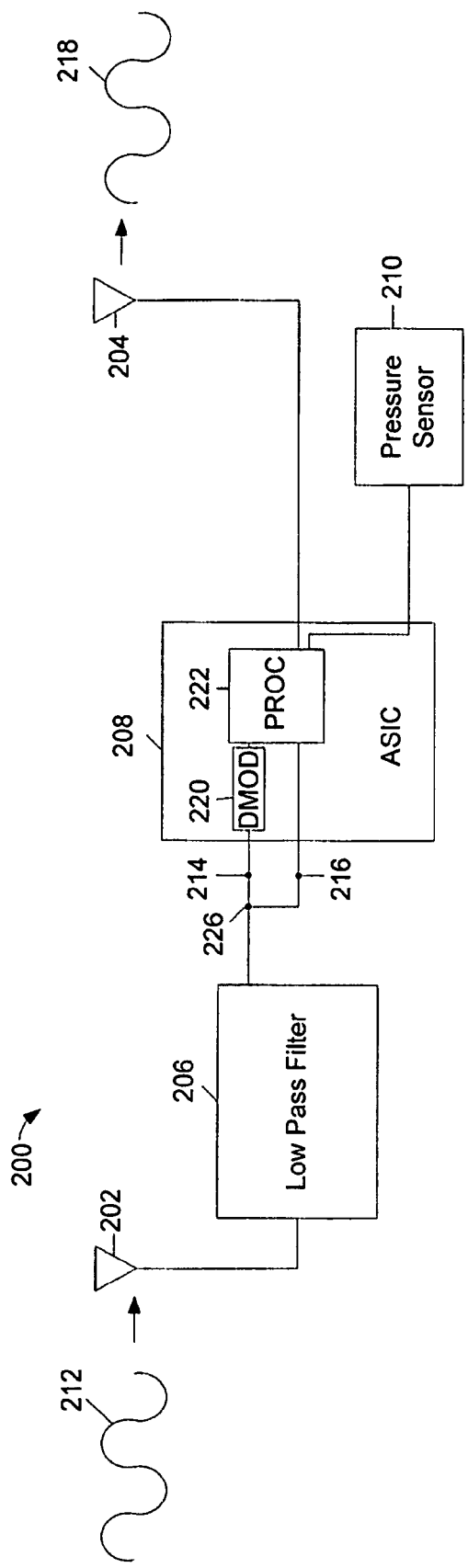
FIG. 2 illustrates an embodiment of the present invention.

FIG. 2 illustrates an example of an embodiment of a TPM sensor 200 used in FIG. 1. The TPM sensor 200 includes a first antenna 202 and a second antenna 204. The TPM sensor 200 also includes an optional low pass filter 206 connected between the first antenna 202 and an application specific integrated circuit (ASIC) 208 at first and second contact points 214, 216, wherein the first and second contact points 214, 216 are both connected to the same node 226. It is to be understood that the ASIC 208 could alternatively be implemented as other devices including, but not limited to, a microcontroller, or a series of interconnected circuit components. In the present example, the ASIC 208 is software programmable. The ASIC 208 is connected to the second antenna 204. The ASIC 208 is also connected a pressure sensor 210.

In the present example, the ASIC 208 includes a carrier detector (CD) that is shown to be implemented as a demodulator 220 coupled with a processor 222 that can act as an edge detector. Accordingly, the CD could detect a carrier signal by demodulating the carrier signal, and then detecting a rising edge of the demodulated signal. Additionally, in the present example, the ASIC 208 is capable of changing the impedance of at least one of the contact points 214, 216 from a high impedance to a low impedance, and then back to a high impedance.

The first antenna 202 receives the LF signal 212 and provides the LF signal 212 to the filter 206. The filter 206 provides a filtered LF signal to the ASIC 208 at the first contact point 214 that has a high impedance. The filter 206 also provides the filtered LF signal to the ASIC 208 at the second contact point 216 that initially has a high impedance.

The ASIC 208 processes the filtered LF signal by demodulating the filtered LF signal and detecting a rising edge of the demodulated LF waveform. A rising edge on the filtered LF waveform signals the ASIC 208 to initiate a tire pressure measuring sequence wherein the ASIC 208 will signal the pressure sensor 210 to measure the pressure in its corresponding tire (not shown), and then the ASIC 208 will provide the tire pressure information via an RF wave 218 through the second antenna 204 to the ECU 110 shown in FIG. 1. However, as stated above, in the present example, the LF signal 212 received by the TPM sensor 200 is unmodulated. Accordingly, the demodulated signal received by the processor 222 has no rising edge. The demodulated signal will be in the form of a substantially constant direct current (DC) signal. Thus, the demodulated signal will not cause the ASIC 208 to initiate the tire pressure measuring sequence.

As stated above, the ASIC 208 has first and second contact points 214, 216 that receive the filtered LF signal. The first contact point 214 has a high impedance. Periodically, the ASIC 208 will change the impedance of the second contact point 216 from a high impedance to a low impedance, such that substantially all of the current from the filtered LF signal will flow into the second contact point 216, thereby short-circuiting the first contact point 214 and the demodulator 220. The short-circuiting of the first contact point 214 will reduce the voltage at the first contact point 214 to a level that is approximately zero (electrical neutral). Then, after waiting a predetermined amount of time (e.g. 5 milliseconds), the ASIC 208 will change the impedance of the second contact point 216 back to a high impedance from a low impedance. Then the filtered LF signal will be demodulated by the demodulator 220 in the ASIC 208 such that the demodulated signal will appear to the processor of the ASIC 208 as having a rising edge about the time that the ASIC 208 switches the second contact point 216 from a low impedance to a high impedance. Accordingly, the filtered LF signal received at the first contact point 214 will have a rising edge, detectable by the processor 222 in the ASIC 208. As stated above, the rising edge will cause the ASIC 208 to initiate the tire pressure measuring sequence, and as such, the ASIC 208 will then signal the pressure sensor 210 to measure the pressure of the corresponding tire (not shown) and provide the RF signal 218 to the ECU 110 of FIG. 1 indicative of the measured pressure. The frequency of this switching of the second contact point 216 from a high impedance to a low impedance and then back to a high impedance can be programmed to meet the needs of specific applications, and can typically range between several minutes and several hours.

Figure 3:
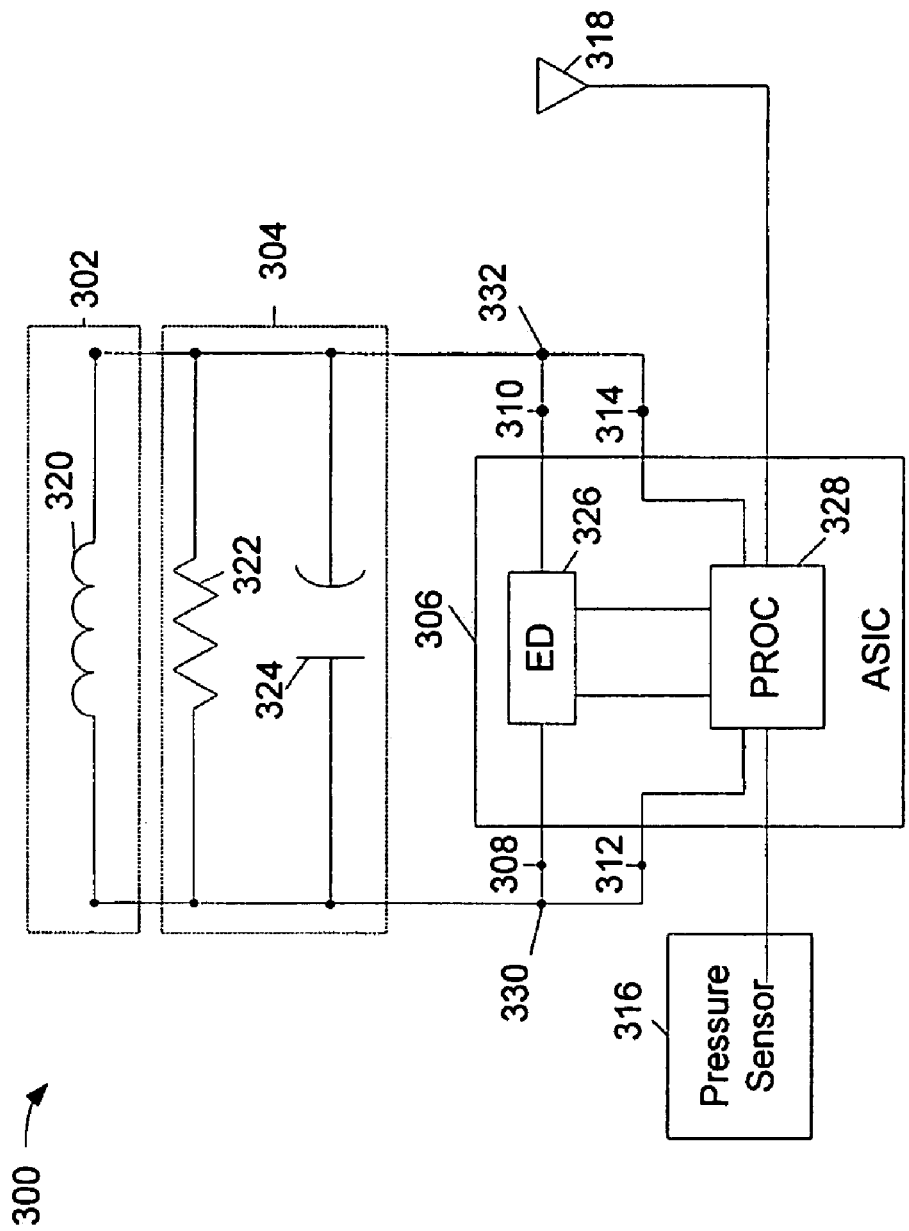
FIG. 3 illustrates another embodiment of the present invention.

FIG. 3 illustrates another embodiment of a TPM sensor 300 that could be implemented in the system illustrated in FIG. 1. The TPM sensor 300 includes a first antenna 302, and an optional low pass filter 304 connected to an ASIC 306 at a first, second, third and fourth contact point 308, 310, 312, 314. Initially, all four of the ASIC contact points 308, 310, 312, 314 are input ports with a high impedance. The first and third contact points 308, 312 are both connected to a first node 330, while the second and fourth contact points are both connected to a second node 332. The ASIC 306 is also connected to a pressure sensor 316 and a second antenna 318.

In the present example, the ASIC 308 includes a CD that can be in the form of an envelope detector 326 coupled with a processor 328 that can act as an edge detector. Accordingly, the ASIC 306 can detect a carrier signal by demodulating a signal using the envelope detector 326 providing the demodulated signal (or envelope of the filtered CW) signal to the processor 328 and then detecting a rising edge of the demodulated signal using the processor 328. Additionally, in the present example, the ASIC 306 is software programmable, and is capable of switching at least two of the contact points from input ports to output ports.

In the present embodiment, the first antenna 302 is an inductor 320. Connected in parallel with the inductor 320 is the optional low pass filter 304. In the present embodiment, the low pass filter 304 is shown as a resistor 322 and a capacitor 324 connected in parallel. It is to be understood that other components could comprise the low pass filter 304, and FIG. 3 illustrates only a resistor 322 and a capacitor 324 for purposes of simplicity.

The first antenna 302 receives an LF signal. The low pass filter 304 is connected in parallel with the antenna 302 such that the low pass filter 304 filters the LF signal and provides a filtered LF signal to the ASIC 306. The ASIC 306 receives the filtered LF signal at the first, second, third and fourth contact points 308, 310, 312, 314. The ASIC 306 will demodulate the filtered LF signal using the ASIC's 306 envelope detector 326. The ASIC 306 will also detect a rising edge of the demodulated signal using the ASIC's processor 328.

When the ASIC 306 detects a rising edge of the demodulated signal, the ASIC 306 initiates a tire measure sequence. In this tire measure sequence, the ASIC 306 signals the pressure sensor 316 to measure the tire pressure in a corresponding tire (not show). The ASIC 306 then processes the information received from the pressure sensor 316, and provides an RF signal indicative of the tire pressure to the second antenna 318 for transmission to the ECU 110 shown in FIG. 1.

As stated above, the LF signal is an unmodulated CW signal. Accordingly, the demodulated signal in the present example does not have a rising edge that is detectable by the ASIC 306. In the present embodiment, the ASIC 306 will periodically change the third and fourth contact points 312, 314 from input ports with a high impedance to output ports driving a "LOW" signal, at a low impedance, while maintaining the first and second contact points 308, 310 as input ports with a high impedance. Accordingly, substantially all of the current flowing into the ASIC 306 will flow into the third and fourth contact points 312, 314, and the voltage at the first and second contact points 308, 310 will reduce to a value of about zero (electrical neutral), effectively short-circuiting the first and second contact points 308, 310 as well as the demodulator 326. Then, after predetermined amount of time, (e.g. about 1-4 milliseconds) wherein the predetermined amount of time varies based on the values of the various circuit components used as well as the frequency of the LF signal, the ASIC 306 will switch the third and fourth contact points 312, 314 back from output ports with a low impedance to input ports with a high impedance. This second switching of the third and fourth contact points 312, 314 will cause the first and second contact points 308, 310 to receive a waveform that when demodulated by the ASIC's 306 demodulator 326, appears to have a rising edge.

When the ASIC 306 detects the rising edge, the ASIC 306 will initiate the tire pressure measuring sequence and will signal the pressure sensor 316 to detect the pressure in the corresponding tire (not shown), and then the ASIC 306 will process the information received from the pressure sensor 316. The ASIC 306 will then send a signal indicative of the tire pressure via an RF signal through the second antenna 318 to the ECU 110 shown in FIG. 1. After sending the RF signal, the ASIC 306 will wait a predetermined amount of time that can be, for example, programmed into the ASIC 306, before repeating its switching of the third and fourth contact points 312, 314 from high impedance input ports to low impedance output ports. This predetermined period of time could range, for example, between several minutes and a several hours.

Figure 4:
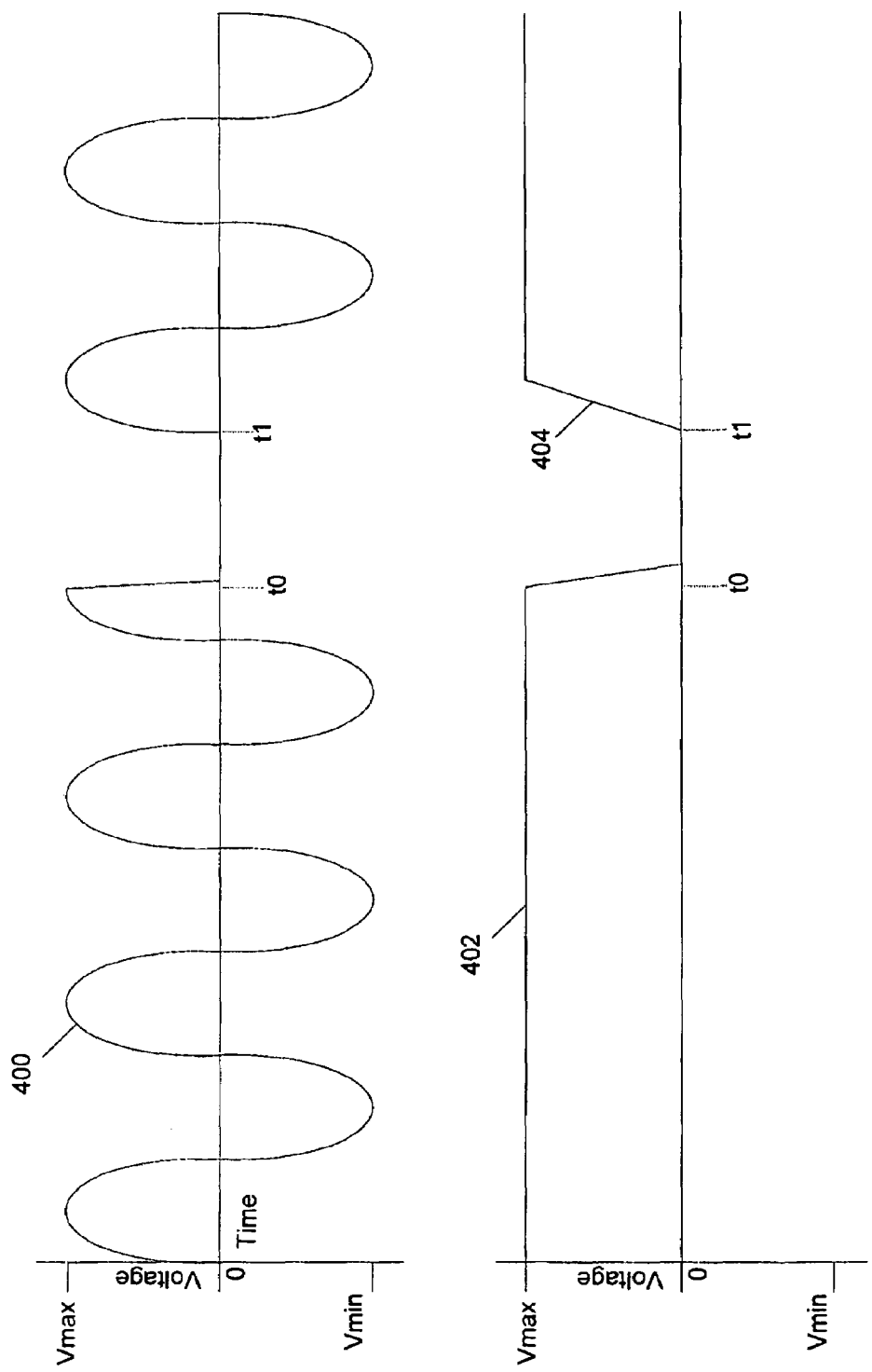
FIG. 4 illustrates an example of a waveform that could be used in an embodiment of the present invention.

FIG. 4 shows waveforms 400, 402 in accordance with an example embodiment of the present invention. The first waveform 400 is a filtered LF signal that illustrates a signal received by an ASIC during a short circuiting of the a first contact point on the ASIC, as described above. The first waveform 400 is shown in the form of a sine wave that will have characteristics dependent upon the original LF signal received by an antenna, as well the characteristics of any intervening filter. Initially, the waveform alternates in a sinusoidal manner between Vmin and Vmax. After a predetermined amount of time, t0, the ASIC switches the impedance of at least one contact point that is coupled to the first contact point from a low impedance to a high impedance, as described above. Thus, the voltage received by the ASIC at the first contact point with a high impedance will reduce to a value of approximately zero (electrical neutral). Then, after a second predetermined amount of time, t1, the ASIC will switch the impedance of the at least one contact point back to its original state. Thus, the waveform 400 that the ASIC will receive at the first contact point will have a "gap" during the short circuiting-period. After the short-circuiting period, the waveform 400 resumes its oscillation between Vmin and Vmax.

The second waveform 402 illustrates the first waveform 400 after the first waveform 400 has been demodulated by the ASIC. The second waveform 402 is generally a square wave that provides a signal of Vmax (or "HIGH") until t0. At t0, the second waveform 402 falls to zero (electrical neutral) until t1, at which time, the second waveform 402 rises back to Vmax. Thus, an edge detector in the ASIC will detect a rising edge 404 about the time of t1. After the short circuiting period, the waveform 402 returns to Vmax (or "HIGH"). It is too be understood that the waveforms illustrated are not drawn with any particular application in mind, and should be used exclusively as an example for understanding the present invention.

Figure 5:
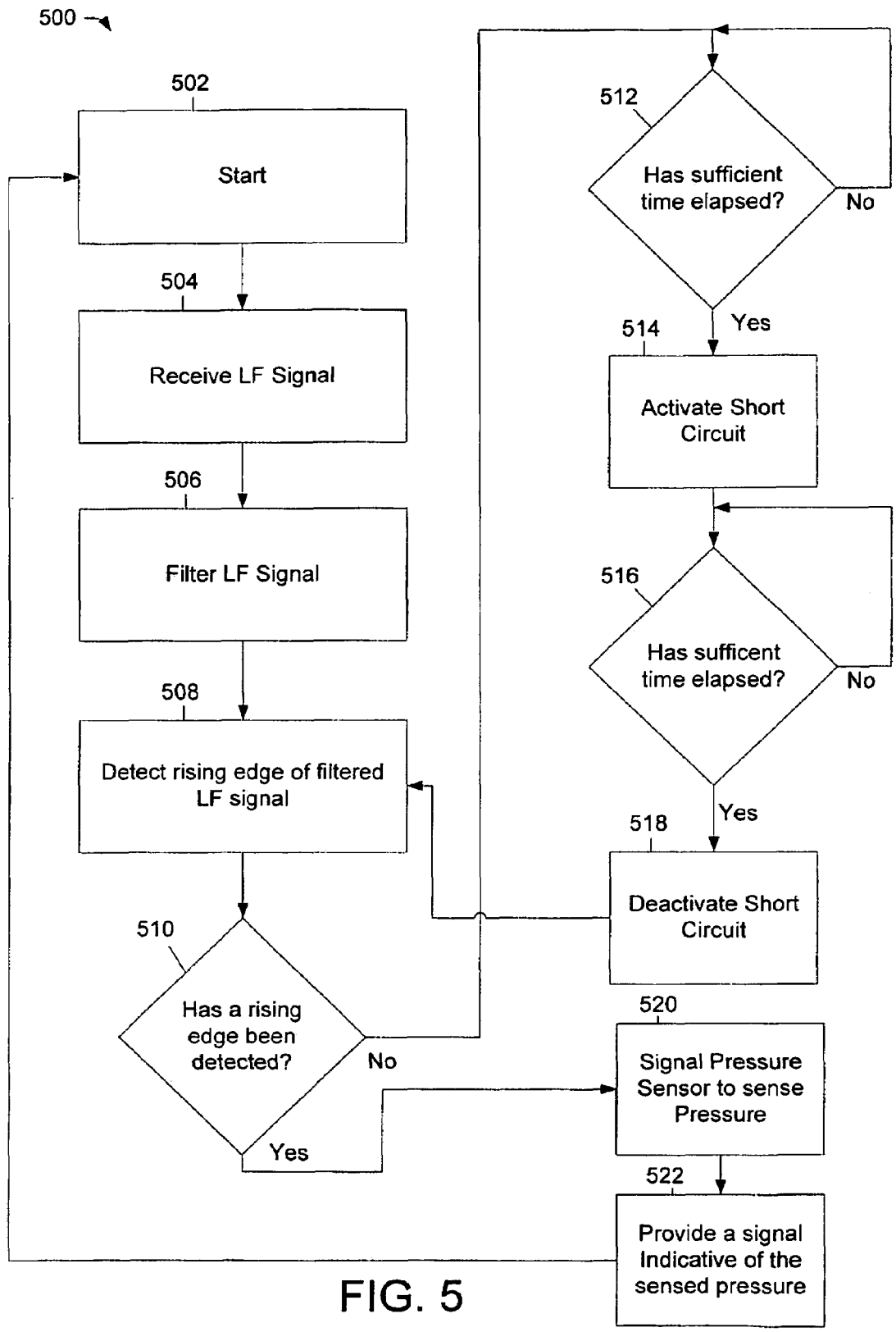
FIG. 5 illustrates a flow chart of a process used in the present invention.

FIG. 5 is a flow chart illustrating an process for a TPM sensor as described in FIG. 1, in accordance with an example embodiment of the present invention. The process 500 is a method for detecting a CW signal. The process begins at step 502 and immediately moves to step 504. At step 504, an LF signal is received. The process then moves to optional step 506 where the LF signal is filtered. At step 508, an attempt is made to detect a rising edge of the filtered signal at an ASIC with a demodulator and an edge detector. At step 510, a determination is made on whether a rising edge has been detected, if one has been detected, the process moves to step 520 (discussed below). If a rising edge has not been detected, the process moves to step 512. At step 512 another determination is made. If sufficient time has elapsed, then the process moves to step 514, otherwise, step 512 is repeated until sufficient time has elapsed.

At step 514, a short-circuit is activated to short-circuit the filtered LF signal. The process then moves to step 516 where a determination is made. If sufficient time has elapsed since the activation of the short-circuit, the process moves to step 518. If sufficient time has not elapsed, the process repeats step 516 until sufficient time has elapsed. At step 518, the short-circuit is deactivated and the process moves to step back to step 508. It should be noted that the activation and deactivation of the short-circuit will cause a rising edge to form in the demodulated signal within the ASIC.

As stated above, if a rising edge is detected the process moves to step 520. At step 520, a pressure sensor is signaled to sense pressure in a tire. The process then moves to step 522 wherein a signal is provided that is indicative of the sensed pressure. The process then returns to the first step, 502 and repeats.

The various embodiments and methods described above provide a number of ways to carry out the invention. Of course, it is to be understood that not necessarily all objectives or advantages described may be achieved in accordance with any particular embodiment described herein. Also, although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of embodiments herein.

Having described the invention, the following is claimed:

1. An apparatus for detecting a continuous wave (CW) signal, the apparatus comprising:
   a demodulator demodulating a received CW signal and providing a demodulated signal;
   an edge detector for detecting an edge of the demodulated signal and thereby, detecting the CW signal; and
   a switchable short-circuit of the demodulator, edges being formed in the demodulated signal when the demodulator is temporarily short-circuited during receipt of the CW signal.

2. The apparatus of claim 1, further comprising an antenna for receiving the CW signal.

3. The apparatus of claim 2, wherein the CW signal is a low frequency (LF) signal.

4. The apparatus of claim 3, further comprising a filter for filtering the CW signal.

5. The apparatus of claim 1, wherein the demodulator, the edge detector and the switchable short-circuit are mounted on an application specific integrated circuit (ASIC).

6. The apparatus of claim 5 wherein the ASIC is programmable to actuate the switchable short-circuit at predetermined periodic intervals.

7. The apparatus of claim 6, wherein the demodulator comprises an envelope detector.

8. The apparatus of claim 7, further comprising an antenna for receiving the CW signal.

9. The apparatus of claim 1 further comprising:
   a first antenna for receiving the CW signal;
   a pressure sensor for detecting air pressure; and
   a second antenna for providing an output signal.

10. An apparatus for detecting a CW signal, the apparatus comprising:
    receiving means for receiving the CW signal;
    demodulating means for determining an envelope of the received CW signal;
    edge detecting means for detecting an edge of the envelope and thereby detecting the CW wave signal; and
    short-circuiting means for temporarily short-circuiting the demodulating means, edges being formed in the envelope when the demodulating means is temporarily short-circuited during the receipt of the CW signal.

11. The apparatus of claim 10, wherein the short-circuiting means, the demodulating means and the edge detecting means are mounted on a programmable ASIC.

12. The apparatus of claim 11, wherein the ASIC activates the short-circuiting means at predetermined periodical intervals.

13. The apparatus of claim 10 further comprising:
    pressure sensing means; and
    signal sending means for providing a signal indicative of a sensed pressure.

14. The apparatus of claim 10, wherein the demodulating means comprises an envelope detector.

15. The apparatus of claim 10, wherein the receiving means comprises an antenna.

16. A method for detecting and processing a CW signal, the method comprising:
    receiving a CW signal at an antenna;
    providing the CW wave to an input of a demodulator;
    providing an output of the demodulator to an edge detector;
    activating a short-circuiting switch to short-circuit the demodulator at predetermined periodical intervals;
    deactivating the short-circuiting switch to create a rising edge in the output of the demodulator; and
    detecting the rising edge at the edge detector.

17. The method of claim 16, further comprising:
    signaling a pressure sensor to sense a pressure; and
    providing a signal indicative of the sensed pressure to a second antenna.

18. The method of claim 16, wherein the deactivating occurs a predetermined amount of time after the activating.

19. The method of claim 18, wherein the activating and deactivating occurs at periodic intervals.

* * * * *